(12) United States Patent
Miller

(10) Patent No.: US 9,964,782 B2
(45) Date of Patent: May 8, 2018

(54) ATTACHABLE PIVOTAL NOSE PROTECTOR FOR EYEGLASSES OR SUNGLASSES

(71) Applicant: Scott Lance Miller, Aspen, CO (US)

(72) Inventor: Scott Lance Miller, Aspen, CO (US)

( * ) Notice: Subject to any disclaimer, the term of this patent is extended or adjusted under 35 U.S.C. 154(b) by 131 days.

(21) Appl. No.: 14/545,397

(22) Filed: Apr. 30, 2015

(65) Prior Publication Data

US 2016/0320639 A1 Nov. 3, 2016

(51) Int. Cl.
| | | |
|---|---|---|
| *G02C 11/00* | (2006.01) | |
| *G02C 9/02* | (2006.01) | |
| *G02C 9/04* | (2006.01) | |
| *G02C 7/16* | (2006.01) | |
| *G02C 9/00* | (2006.01) | |

(52) U.S. Cl.
CPC .............. *G02C 11/00* (2013.01); *G02C 7/16* (2013.01); *G02C 9/00* (2013.01); *G02C 9/02* (2013.01); *G02C 9/04* (2013.01)

(58) Field of Classification Search
CPC ... G02C 9/00; G02C 9/02; G02C 9/04; G02C 7/16; G02C 11/00
USPC ........................................ 351/124, 131; 2/13
See application file for complete search history.

(56) References Cited

U.S. PATENT DOCUMENTS

| | | | | | |
|---|---|---|---|---|---|
| 2,368,303 | A | * | 1/1945 | Johnston | A61F 9/025 2/426 |
| 3,575,497 | A | * | 4/1971 | Leblanc | G02C 7/10 351/47 |
| 4,786,159 | A | * | 11/1988 | Piazza, Sr. | G02C 5/12 351/132 |
| 4,843,643 | A | * | 7/1989 | Parissenti | A41D 13/11 128/857 |
| 4,924,526 | A | * | 5/1990 | Parissenti | A61F 9/029 2/13 |
| 5,151,600 | A | * | 9/1992 | Black | G02C 11/00 250/372 |

(Continued)

OTHER PUBLICATIONS

No Author, "Invention 11649-Nose Ultraviolet Light Protection Shield", Dec. 9, 2010, IdeaConnection, https://www.ideaconnection.com/inventions/11649-Nose-Ultraviolet-Light-Protection-Shield.html, pp. 1-3.*

*Primary Examiner* — William R Alexander
(74) *Attorney, Agent, or Firm* — Ingenium Patents LLC; Peter R. Kramer

(57) ABSTRACT

Clip on "flip-up" attachable auxiliary nose protection assembly adapted to clip onto a pair of eyeglasses or sunglasses and including a nose protection piece pivotally movable to a first position covering a persons nose and a second position uncovering a persons nose to protect the wearers nose from sunlight or to allow the wearer to modulate some sunlight exposure. The apparatus has two main parts, including a clip means which attaches to a pair of eyeglasses or sunglasses and a nose protection portion which is pivotally attached to the clip means. Preferably the nose protector and the clip means are manufactured from lightweight durable plastic and moldable metal. When the nose protection apparatus is attached to pair of eyeglasses or sunglasses the nose protection portion may be locked into a functional position or a position which is substantially parallel to the wearers nose and an inoperative position or a position which is substantially perpendicular to the wearers nose.

2 Claims, 4 Drawing Sheets

(56) References Cited

U.S. PATENT DOCUMENTS

| | | | | |
|---|---|---|---|---|
| 5,164,749 A | * | 11/1992 | Shelton | G02C 9/04 351/47 |
| 5,167,036 A | * | 12/1992 | Daprato | G02C 11/00 2/13 |
| 5,247,706 A | * | 9/1993 | Mark | A61F 9/025 2/13 |
| 5,274,847 A | * | 1/1994 | Lauttamus | G02C 11/00 2/206 |
| 5,379,463 A | * | 1/1995 | Schleger | A61F 9/029 2/431 |
| 5,379,464 A | * | 1/1995 | Schleger | A61F 9/029 2/431 |
| 5,416,923 A | * | 5/1995 | Peugh | A61F 9/029 2/206 |
| 5,471,679 A | * | 12/1995 | Paoluccio | A61F 9/025 2/9 |
| 5,666,664 A | * | 9/1997 | Hamilton | A61F 9/029 2/13 |
| 5,717,992 A | * | 2/1998 | Tilghman | A61F 9/029 2/206 |
| 5,880,805 A | * | 3/1999 | Naessens | G02C 9/04 351/47 |
| 6,488,373 B1 | * | 12/2002 | Feinbloom | G02C 7/088 351/158 |
| D626,583 S | * | 11/2010 | Fuchs | D16/309 |
| 2005/0001977 A1 | * | 1/2005 | Zelman | G02C 1/04 351/57 |
| 2007/0211209 A1 | * | 9/2007 | Liu | G02C 9/04 351/47 |
| 2011/0075093 A1 | * | 3/2011 | Hobbs | G02C 7/16 351/45 |
| 2012/0036608 A1 | * | 2/2012 | Beliveau | A61F 9/029 2/9 |

* cited by examiner

ATTACHABLE PIVOTAL NOSE PROTECTOR FOR EYEGLASSES OR SUNGLASSES

BACKGROUND OF THE INVENTION

1. Field of the Invention

The present invention relates to skin protection devices and more particularly to a pivotal device for creating a physical barrier for protecting skin on the nose from solar radiation or the weather attachable to a pair of eyeglasses or sunglasses.

2. Description of Prior Art

It is well known the skin on the nose is particularly sensitive to cancer resulting from exposure to excessive sunlight. Furthermore, the nose tends to sustain more exposure to sunlight relative to other parts of the body and is thus more likely to become "sun-burned". In an attempt to prevent this situation, baseball caps of various kinds have been worn to protect the nose from excessive exposure. However, caps are inappropriate for certain outdoor activities such as kayaking or skiing. Furthermore hats are ineffective It is common practice to apply various ointments and sunscreen lotions to the nose to serve as a barrier against sunlight. While generally effective when properly used, there are several drawbacks with such ointments and lotions such as allergies and perspiration stripping away the protective film created by the ointments or lotions. Such ointments and lotions only provide limited protection from the harmful rays of the sun.

In an attempt to overcome some of the disadvantages associated with the use of hats, ointments and lotions, physical barriers have been utilized to shield the nose from sunlight. These barriers are often attached to glacier glasses or wedged beneath a pair of eyeglasses or sunglasses, both of which require the wearer to remove his or her eyeglasses or sunglasses to attach it. Having to remove one's eyeglasses or sunglasses can be a great inconvenience especially when doing any physical activity.

Accordingly, it is an object of this invention to provide auxiliary nose guard protection which may be adeptly attached to a pair of eyeglasses or sunglasses without having to remove the eyeglasses or sunglasses from the face of the wearer.

For several years auxiliary sun glasses with this pivotal clip on "flip-up" feature have been used using a clip mechanism that allows the wearer to move the lenses out of the way of the wearers vision and also allows the wearer to attach the auxiliary sunglasses to eyeglasses or spectacles without the wearer having to remove their eyeglasses or spectacles.

Accordingly, it is an object of this invention to provide auxiliary nose guard protection which may be adeptly clipped on and attached to a pair of eyeglasses or sunglasses that may be "flipped-up" to a non-use position that allows the wearer to modulate the sun exposure to the wearers nose without having to remove the protection device.

U.S. Pat. No. 1,761,664 issued on Jun. 3, 1930 to H. G. Harris discloses a nose protector. The protector includes a material that adheres to the nose or being taped to the nose.

U.S. Pat. No. 1,962,818 issued on Jun. 12, 1934 to E. H. Hoffman discloses a sunshield for the nose, that hooks on to the bridge of a pair of eyeglasses or sunglasses.

U.S. Pat. No. 2,233,698 issued on Mar. 4, 1941 to A. Giround discloses a detachable nose shield for sunglasses or the like, that is molded to fit the shape of the nose and presses into a pair of eyeglasses or sunglasses.

U.S. Pat. No. 3,007,173 issued on Nov. 7, 1961 to V. F. Gangoll discloses a nose piece buckle, with material that snaps around the bridge of a pair of eyeglasses or sunglasses.

U.S. Pat. No. 5,164,749 issued on Nov. 17, 1992 to Robert Shelton discloses a clip for mounting sunglass lenses on spectacles, that allows auxiliary lenses to be "flipped-up" and attached without removing the wearers eyeglasses or spectacles.

U.S. Pat. No. 5,176,036 issued on Dec. 1, 1992 to Gary A. Daprato discloses a nose Protector, which ties onto a pair of eyeglasses or sunglasses.

U.S. Pat. No. 5,274,847 issued on Jan. 4, 1994 to Richard A. Lauttamus discloses a nose protector, that ratchets around the bridge of a pair of eyeglasses or sunglasses.

U.S. Pat. No. 5,416,923, issued on May 23, 1995 to Peugh discloses a removable nose shield for sunglasses, that velcros under the bridge of a pair of eyeglasses or sunglasses.

U.S. Pat. NO. Des. 301,250 issued on May 23, 1989 to Michael G. Stephens discloses auxiliary lenses for eyeglass, which clips onto a pair of eyeglasses or spectacles that shows an in use position and a non-use position clip mechanism for the auxiliary lenses.

U.S. Pat. NO. Des. 430,707 issued on Sep. 5, 2000 to Brian K. Petraborg (c/o Sunday International) discloses a nose protector, that velcros over and around the bridge of a pair of eyeglasses or sunglasses.

None of the above inventions and patents shown or taken either singularly or in combination are seen to describe the instant invention as claimed for a clip on, "flip-up" nose protector.

SUMMARY OF THE INVENTION

This invention relates to a nose protector assembly and more particularly to auxiliary nose guards designed to be removably attached to and supported by a pair of ordinary eyeglasses or sunglasses. The auxiliary nose protection, which may be nose guards or the like, is pivotal between a first covering position wherein it overlies a person's nose and a second uncovering position wherein it is removed from over the persons nose to a perpendicular position to the eyeglasses or sunglasses, not in line to the vision of the wearer.

For several years auxiliary sunglasses for eyeglasses with this clip on "flip-up" pivotal feature have been produced.

Also, many auxiliary nose guards have been produced; however. Those require the user to remove his eyeglasses or sunglasses in order to attach the auxiliary nose protector thereto. This is usually accomplished by wrapping the top portion of the nose protection around the bridge of the eyeglass or sunglass frame.

Having to remove one's eyeglasses or sunglasses to attach the auxiliary nose protection can be a great inconvenience especially when skiing, climbing, lifeguarding or sunbathing, for example, which are some of the principal types of uses this auxiliary nose guard is designed for.

Accordingly, it is an object of this invention to provide an auxiliary nose guard protector which may be adeptly attached to a pair of eyeglasses or sunglasses without removing the eyeglasses or sunglasses from the face of the wearer.

It is another object of the invention to provide a "flip-up", clip on auxiliary nose guard protector for eyeglasses and sunglasses wherein the nose guard element is releasably but firmly held to the eyeglasses or sunglasses in a first covering position relatively parallel to the wearers nose or a second non-covering position relatively perpendicular to the wearers nose.

It is still another object of the present invention to provide an auxiliary nose guard protector which includes a clip element that is adjustable to fit a greater than usual variety of eyeglass or sunglass frames and has improved holding characteristics.

It is still a further object of this invention to provide a "flip-up", clip-on auxiliary nose guard protection for eyeglasses or sunglasses that is simple to manufacture and assemble and which is formed of a minimum number of parts preferably of bent metal and or plastic.

In accordance with the object of the invention, a nose guard is provided for shielding the nose of an individual from excessive exposure to the elements and mostly to solar radiation. The unique design provides protection to the nose, while not effecting vision or causing the eyewear to be heavy. In preferred embodiments of the invention, the nose guard includes lightweight non-translucent hypo-allergenic plastic.

BRIEF DESCRIPTION OF THE DRAWINGS

Other objects and advantages of the invention will become apparent from the following description when taken in conjunction with the accompanying drawings in which.

DETAILED DESCRIPTION OF THE DRAWINGS

Figure 1:
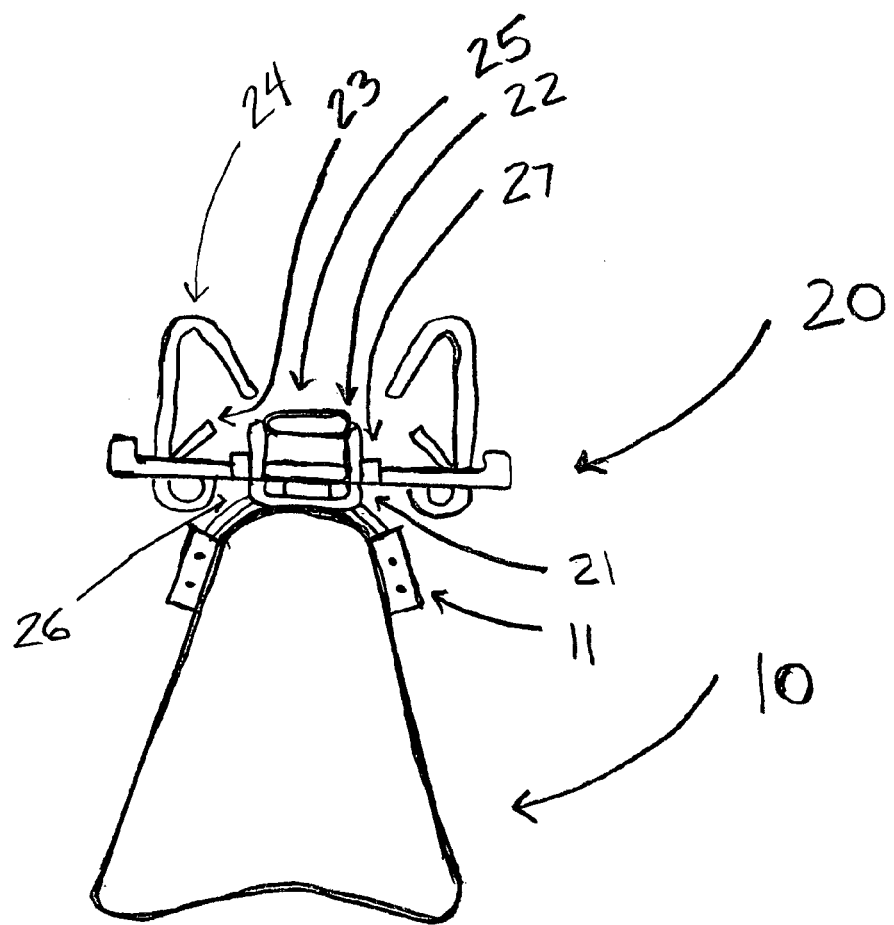
FIG. 1, is a perspective view of the auxiliary nose guard protector assembly embodying the invention.

With reference to FIG. 1, a nose guard is shown for protecting the nose from excessive exposure to sunlight and the elements. The nose guard protection is helpful in preventing sunburn and skin diseases, such as cancer which result from exposure to solar radiation. The nose guard is ideally suited for use by sunbathers, lifeguards, skiers, climbers and kayakers or any athlete or person who are exposed to sunlight for prolonged periods of time.

Figure 2A:
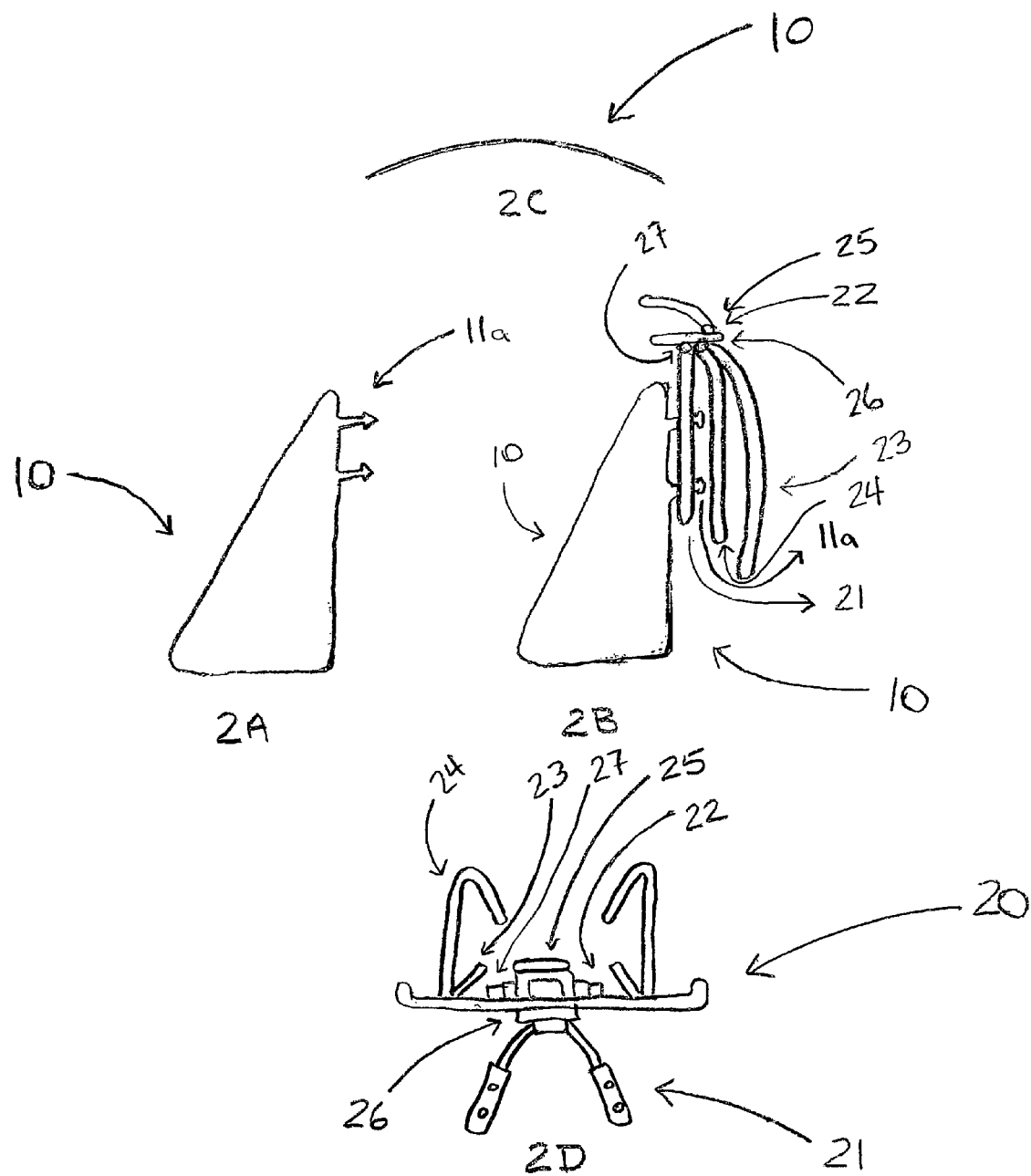
FIG. 2, is a perspective view of the principal elements of the assembly separated in space to show them more clearly.

The nose guard portion of the apparatus, FIG. 2, 2A. 10 with the tabs 11 folded out, and or FIG. 2, 2B, 10 with the tabs 11 folded in, is integrally molded in a unitary construction from a substantially non-transparent material, such as lightweight dark or light colored moldable plastic or foam rubber. It will be understood that such material may be colored as desired to provide a light screen effect, in which case the nose guard portion will serve as a screen for the nose. The nose guard portion should be in a curved shape, FIG. 2, 2C, to provide shading for the entire nose.

The nose guard FIG. 2, 10, may be attached to a clip means, FIG. 2, 2D, 21, by way of tiny rivets, pins and/or screws to the backside vertical mounting portions of the nose guard, FIG. 2, 2A, 11 or FIG. 2, 2B, 11.

The clip means, FIG. 2, 2D, 20 is integrally formed or molded and may be comprised of a U-shaped bridge FIG. 2, 2D, 21, preferably formed of metal or plastic, which may be any means which can attach the nose guard portion FIG. 2, 10 as described above to a central pivotal portion FIG. 2, 2D, 22, and at least two pair of fingers, FIGS. 2, 2D, 23 and 24 which are formed to act like spring actuated clamps.

The pair of fingers FIGS. 2, 2D, 23 and 24 are disposed evenly on the respective sides of the central pivotal portion FIG. 2, 2D, 22 and extend in an opposite facing relation thereto. The clip means may be integrally molded or formed from a suitable material, such as durable plastic or formed from moldable bendable metal. The entire clip means FIG. 2, 2D, 20 including the pair of fingers, is adapted to extend transversely across the glasses portion of a pair of eyeglasses or sunglasses when attached thereto.

Figure 3:
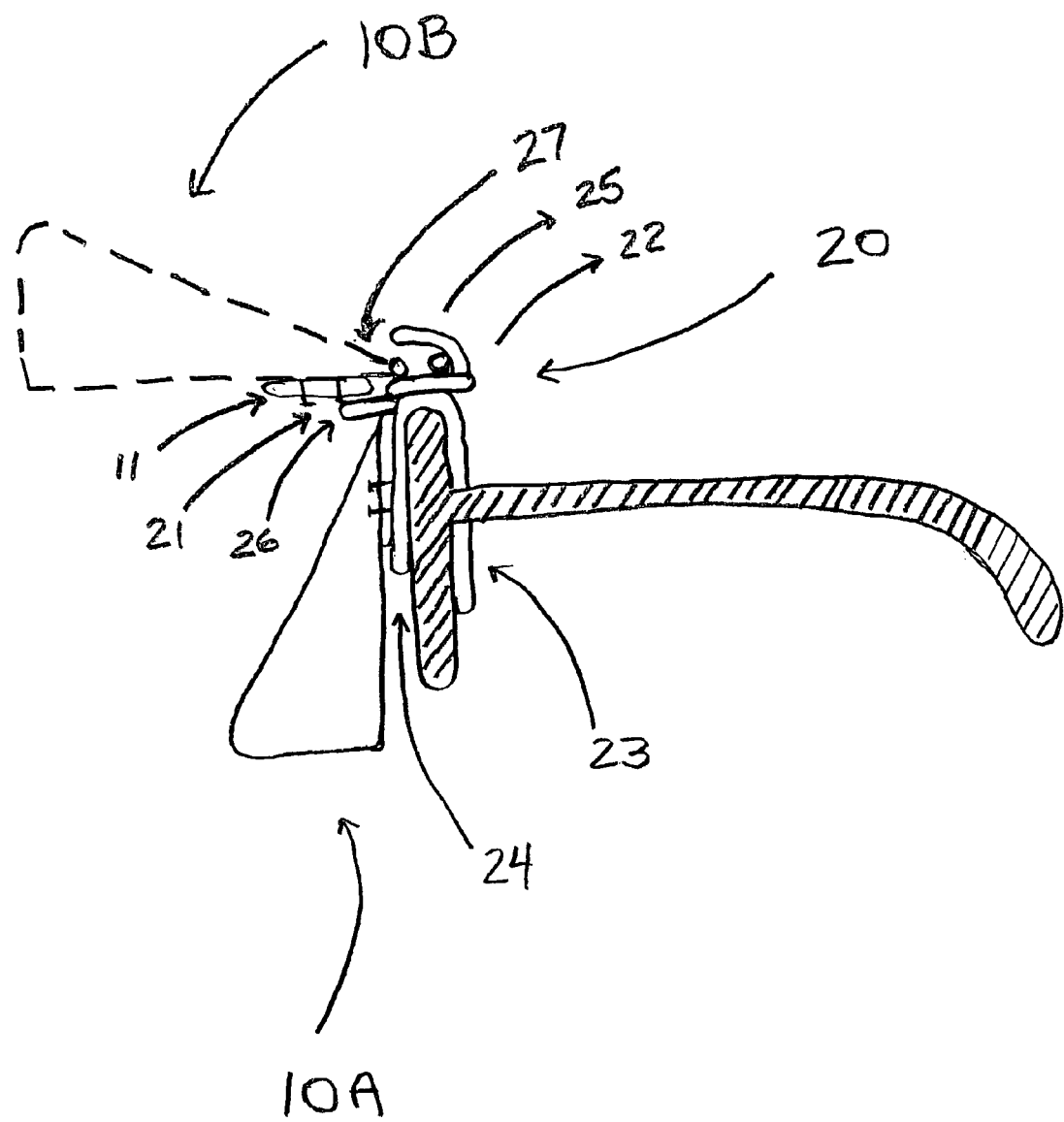
FIG. 3, is a sectional view of the assembly showing the nose guard protector in a position of use on a pair of eyeglasses or sunglasses during movement to a "flipped-up" position of non-use on a pair of eyeglasses or sunglasses.

As shown in FIG. 3, the pair of fingers 23 and 24 engage the top of the eyeglasses or sunglasses by fitting over the frame, one pincer in the front and one in the back, clamping onto the eyeglasses or sunglasses conveniently and easily by pinching a centrally located spring tensioned finger and thumb engaggable portion 25 and 26.

As shown in FIG. 3, the u-shaped portion 21 of the clip means FIG. 1, 20, is connected to the central pivot portion FIG. 3, 22 by way of a hinge 27 which has a means to lock the nose guard protector portion into a functional position 10A or into an inoperative position 10B.

Figure 4:
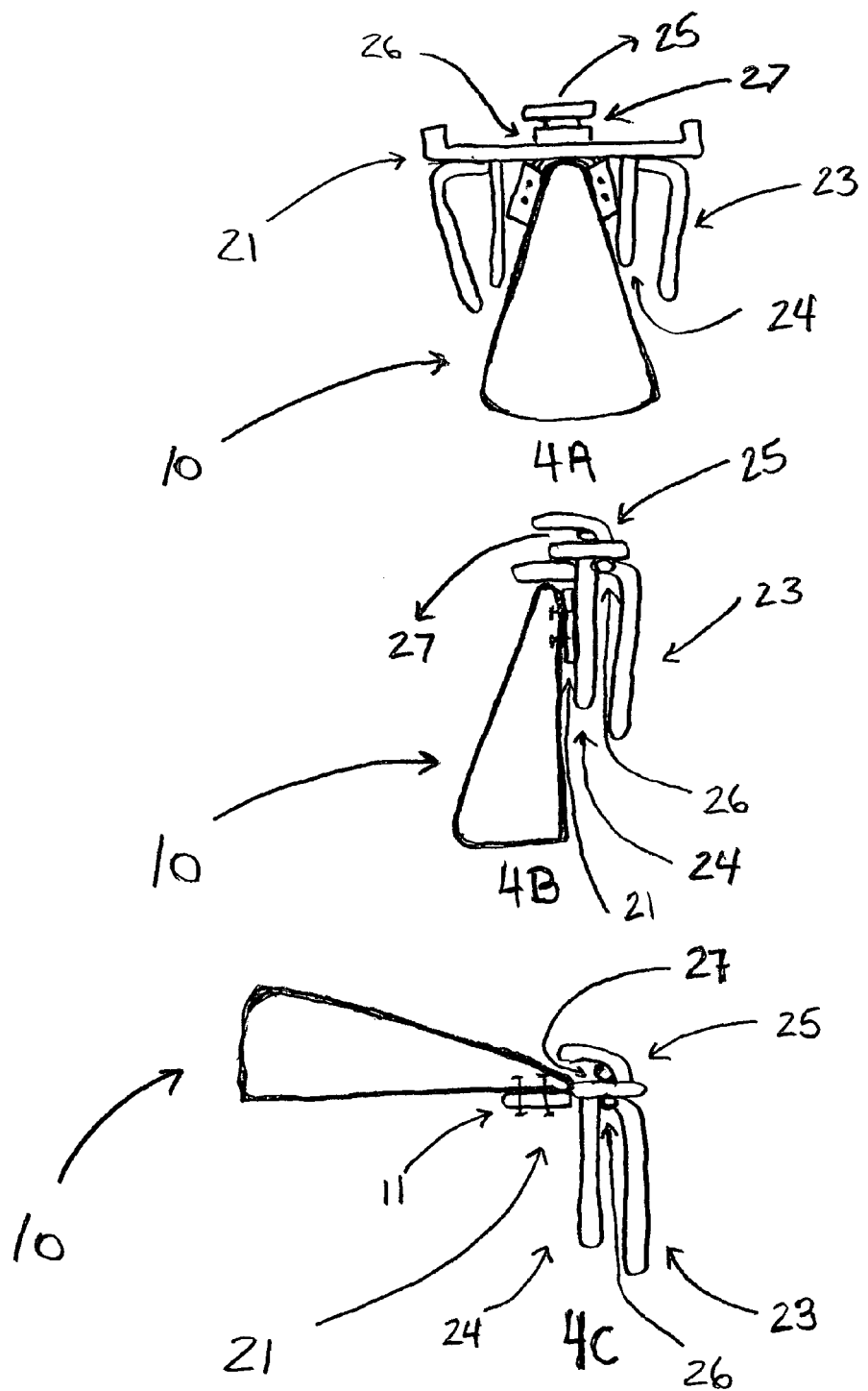
FIG. 4, is a fragmentary sectional view of the assembly as shown in FIG. 3, with the nose guard portion in the first or covering position and with the nose guard portion in the second or uncovering position.

As shown in FIG. 4, 4A, a frontal view, and FIG. 4, 4B a side view, of the functional position, being the position where the nose guard protector is relatively parallel to the wearers nose, and as shown in FIG. 4, 4C, a side view of the inoperative position where the nose guard protector is pushed upward or relatively perpendicular to the wearers nose.

From the foregoing descriptions it will be understood that the present invention provides a nose guard protection apparatus which can be readily clipped onto the glasses portion of a pair of eyeglasses or sunglasses.

When in the covering position while being worn on a pair of eyeglasses or sunglasses the nose guard portion can be readily flipped through a ninety degree angle between the functional covering position and the inoperative non-covering position, which is convenient when the nose guard protection is not desired.

The two piece construction of the invention permits case of attachment and detachment from the eyeglasses or sunglasses without effecting the locking mechanism for the position of the nose guard, while permitting pivotal movement between the functional operative and the non-functional inoperative positions of the nose guard.

It is also understood the said invention will be available in assorted sizes to fit various nose sizes and it is also understood that the said invention will be available in assorted colors.

Thus, the objectives of the invention are achieved by an assembly including simple and inexpensive elements or members which are easily assembled and which cooperate in a manner to achieve the desired results.

Although the above description has included only one embodiment of the present invention, it will be understood that the invention may be embodied in other specific form without departing from the spirit or essential characteristics thereof. The present embodiment is therefore to be considered in all respects as illustrative, and not restrictive. The scope of the present invention is indicated by the appended claims rather than the by the foregoing description.

I claim:

1. A nose protector attachable to a bridge of a wearer's pair of eyeglasses and removable to and from the wearer's eyeglasses without removing the eyeglasses from the wearer's face comprising, a nose guard, an integral hinge, and a clip, said clip configured to engage the bridge of the eyeglasses, said nose guard pivotably attached to said clip by means of said integral hinge, wherein, while in use, said nose guard vertically pivoting, without need for removing or lifting the eyeglasses from the bridge of the wearer's nose, about said clip, said nose guard pivoting about said clip with a transverse axis of rotation between said nose guard and said clip, and further wherein said clip is configured to attach to a central front portion of the eyeglasses, said nose protector further being configured to toggle said nose guard between nose covered and nose uncovered positions by pivoting said nose guard about said transverse axis while the nose protector is attached to the eyeglasses and in use.

2. A nose protector, to protect a user's nose, comprising, a nose guard, a clip, said clip further comprising, a pair of elongated inner fingers, a pair of elongated outer fingers, a pivotal portion, and a hinge, said inner and outer fingers and said hinge being attached to said pivotal portion, said inner fingers and said outer fingers configured wherein said inner and outer fingers are biased toward each other and configured to engage and grasp the lenses of a pair of spectacles, said pivotal portion further comprising a hand engageable portion, a U-shaped bridge, said U-shaped bridge attached to said clip at the hinge, said nose guard attached to said U-shaped bridge, said U-shaped bridge, hinge, and pivotal portion configured wherein said nose guard is capable of being moved by means of said hand engageable portion from a position covering the user's nose to an uncovered position.

\* \* \* \* \*